Dec. 3, 1957  D. D. POST  2,815,202
VEHICLE SUSPENSION APPARATUS
Filed Feb. 11, 1954
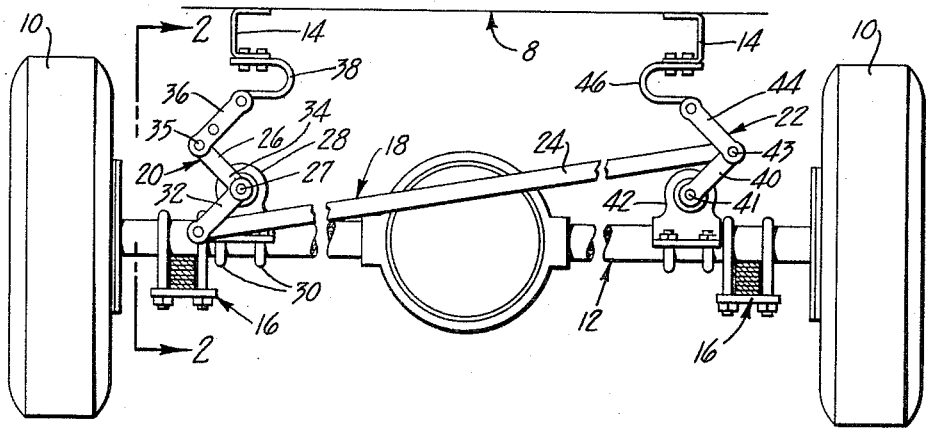
FIG_1_
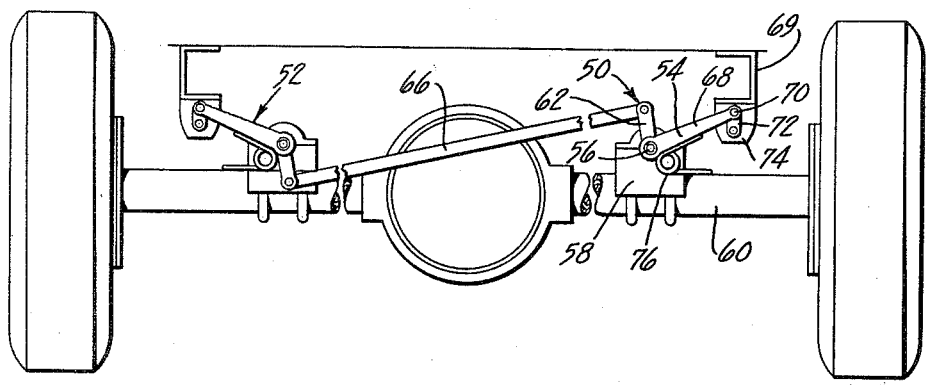
FIG_3_
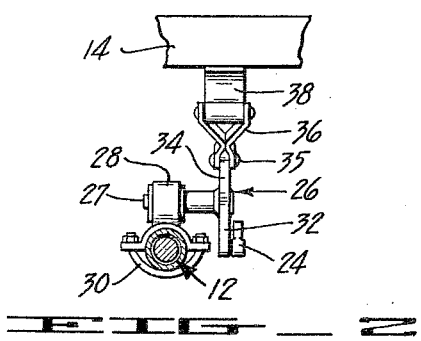
FIG_2_
INVENTOR.
David D. Post
BY George Sipkin
Paul U. Pritchard Jr.
ATTORNEYS United States Patent Office 2,815,202
Patented Dec. 3, 1957

2,815,202

VEHICLE SUSPENSION APPARATUS

David D. Post, Richmond, Calif.

Application February 11, 1954, Serial No. 409,787

2 Claims. (Cl. 267—11)

(Granted under Title 35, U. S. Code (1952), sec. 266)

This invention may be manufactured and used by or for the Government of the United States of America for governmental purposes without payment of any royalties thereon or therefor.

This invention relates to vehicle suspension systems and more particularly to stabilizing apparatus for maintaining vehicle equilibrium.

Any passenger in a moving vehicle has experienced the effects arising from a change in direction as the vehicle is maneuvered around a curve. To remain in equilibrium under this condition the passenger must not only overcome the tendency of his own weight to continue moving in a straight direction, but also to compensate for the same tendency in the vehicle as exaggerated by the spring suspension system. Thus, vehicle sway usually requires a physical effort by the passengers, and in trucks may cause a load in varying degrees depending, of course, on the type, weight and speed of the vehicle, and the radius of the curve. In some instances excessive sway may cause spring strain and permanent deformation. Similar effects occur when one of the vehicle wheels rides over a bump or recess in the road subjecting the vehicle to a rocking action.

Some types of suspension systems have attempted to incorporate mechanism for maintaining the vehicle frame on an even level with the ground but these systems were either complicated in design or formed as an integral part of the suspension system. In another system the stabilizing apparatus was suspended from the frame by a fixed pivot and as the swaying action of the vehicle was imparted to the frame, the apparatus was ineffective to stabilize vehicle movement.

A principal object of this invention is to provide apparatus for use with a spring suspended vehicle system which will maintain the stable equilibrium of vehicle during a turning movement.

Another object is to provide such an apparatus for equalizing the vertical thrust on both sides of the frame when one of the vehicle wheels rides over an uneven surface in its path.

Still another object is to provide apparatus for maintaining the vehicle frame substantially parallel to the axle.

Further objects are to provide apparatus for equalizing the stress on the spring suspension system; to provide stabilizing apparatus for use with existing vehicle suspension systems with little or no change to the equipment; and to provide stabilizing apparatus which is simple in construction, capable of being easily installed.

Other objects will become apparent from the detailed description and the accompanying drawing.

It has been found that the disturbing effects of both vehicle side sway and vertical thrust arising from obstacles in the vehicle path can be substantially limited by the use of stabilizing apparatus which generally includes a pair of spaced interconnected linkage assemblies positioned on the sides of the vehicle between the frame and the axle. Each articulated assembly is provided with a fixed pivot attached on the axle housing, one part of each assembly being articulated to the frame by a pivotally connected link providing a floating pivot. Both linkage assemblies are interconnected, preferably by a rigid tie rod, and are so arranged that a vertical thrust on one side of the frame is translated by the stabilizing apparatus to the other side of the frame in the same direction as the original force. Thus, when a downward force is applied to one side of the frame, the force is transmitted to the other side in a downward direction to maintain the frame substantially level with the axle or the road. Each articulated assembly may be provided with a resilient component to absorb any shock to which the stabilizing apparatus may be subjected.

The floating pivots in the assemblies may be arranged to move outwardly or inwardly but in opposite directions to balance the applied torque to the frame and on the suspension system that may arise from the operation of the equalizing apparatus. It has been found that the preferred manner of accomplishing this result is to use a bell crank in one of the assemblies, and to extend the interconnecting tie rod in a direction to cross a straight line passing through the fixed pivot points about which the assemblies rotate. In one modification the stabilizing apparatus may be used with an existing vehicle spring suspension system, and in another modification a spring suspension is incorporated in the apparatus.

In the drawing, Fig. 1 is a rear elevation of a vehicle chassis having mounted the stabilizing apparatus of this invention; Fig. 2 is a side elevation taken along line II of Fig. 1; and Fig. 3 is a view similar to Fig. 1 of a modified stabilizing apparatus.

Referring to the drawing, in Fig. 1 reference numeral 8 indicates a vehicle chassis, such as for an automobile, truck, trailer, or the like, including a pair of wheels 10 connected by an axle housing 12 for supporting a frame 14 through a spring suspension 16 in a manner well known in the art for absorbing shocks to the chassis and providing a safer and more comfortable riding vehicle. Although most vehicle spring suspension systems may operate satisfactorily under normal operating conditions, one disadvantage in some systems arises during turning, especially at high speeds or in sharp turns, when the vehicle may sway excessively. This swaying motion as previously described exerts a disturbing force on the vehicle load, whether it be occupants or cargo, as well as an uneven stress on the suspension system. A similar result occurs when the vehicle rides over an uneven surface. The present invention is directed to overcome these effects by providing a stabilizing or equalizing apparatus 18 capable of being attached to the vehicle chassis for maintaining the frame and axle substantially level under all operating conditions.

The stabilizing apparatus generally includes a pair of linkage assemblies 20 and 22 each fixed on one side of the vehicle between the frame and axle, the assemblies being interconnected, preferably, by a rigid tie rod 24 whereby a vertical force applied to the vehicle frame on one side will be laterally translated to the other side of the frame in the same direction as the original force. Referring to Figs. 1 and 2, linkage assembly 20 comprises a bell crank 26, preferably, made of forged steel, and immediately journaled at a fixed pivot 27 on a bracket 28 clamped to axle housing 12 by U-bolts 30. One bell crank arm 32 is pivotally connected to one end of tie rod 24, and the other bell crank arm 34 is pinned at a pivot 35 to one end of an H-shaped link 35 which, in turn, is pivotally mounted to a free end of a U-shaped bracket 38 bolted at the other end to frame 14. As link 36 is pivotally mounted at both ends and is movable both vertically and horizontally between the frame and bell crank to turn the latter, it may be called a floating linkage, and, similarly, pivot 35 a floating pivot. Bracket 38 may be considered as a flexible link both to protect the foregoing articulated assembly 20 by absorbing shocks, as well as transmit a vertical thrust on that side of the frame to bell crank 26 whereby the force is resolved into a lateral thrust on tie rod 24 being directly connected to linkage assembly 22 on the other side of the frame.

Linkage assembly 22 performs a function similar to linkage assembly 20 in that it resolves the lateral thrust on tie rod 24 into a vertical thrust on the frame in the same direction as the original force. However, linkage assembly 22 differs from assembly 20 in that a simplified assembly may be used, namely, a pivotable connecting link 40 instead of bell crank 26. One end of link 40 is movable about a fixed pivot 41 on a bracket 42, which like bracket 28, is bolted to axle housing 12. As the counter-part assembly 20, the other end of the link 40 is pivotally connected to a floating link 44 at a floating pivot 43, link 44 being pivoted to a U-shaped bracket 46 which is bolted to the corresponding side of frame 14. Tie rod 24 is connected to links 40 and 44 at the intermediate floating pivot 43 such that floating pivots 35 and 43 of the respective assemblies are movable in a vertical plane in opposite directions, or, in other words, both floating pivots similarly move either outwardly one way from the other or inwardly towards one another. The direction depends on the direction of the vertical force on the frame, and in this manner any torque exerted on both sides of the chassis by the stabilizing assemblies will be balanced. In order to obtain this opposing action to the assemblies, it has been found desirable that the tie rod 24 cross a straight line passing through fixed pivot points 27 and 41 of the assemblies.

The operation of stabilizing apparatus 18 is probably apparent from Fig. 1 where it may be assumed that the vehicle is traveling in a direction into the drawing. In making a left turn, the tendency of the vehicle to continue in a straight line will cause the right side of the frame to be depressed and the left side to be elevated. The downward force applied to the right side of the frame contracts links 40 and 44 moving pivot 43 and tie rod connected thereto in an outward direction. This outward lateral force is transmitted through tie rod 24 to the other side of the frame to rotate bell crank 26 counter-clockwise, forcing floating pivot 35 outwardly and through links 36 and 38 to move frame 14 downwardly, which it will be noted is in the same direction as the original applied force on assembly 22. Thus, frame 14 is maintained in a substantially level relation with the axle preventing excessive vehicle sway. The pivotable links 36 and 44 on each side of the frame are necessarily canted from the vertical to avoid a dead center arrangement, and with opposite inclinations in order to move the respective floating pivots 35 and 43 in opposite directions for converting the vertical force into a horizontal component, or vice versa. The foregoing action balances the torque on both the spring suspension system and the frame, and, of course, functions to equalize the vertical forces on the frame which is one of the principal features of this invention. It is obvious that the above stabilizing action also occurs when one of the wheels rides over a bump or into a recess in the road.

In Fig. 3 a modified stabilizing apparatus is disclosed differing in construction from the stabilizing apparatus of Fig. 1 in that a spring suspension system is incorporated in the stabilizing apparatus, the articulated assemblies being arranged both to carry the vehicle load as well as equalize the forces causing vehicle sway. Each articulated linkage 50 and 52 may be substantial duplicates and, accordingly, a detailed description of assembly 50 should suffice for both, identical parts being referred to by the same reference numeral. Linkage assembly 50 consists of a bell crank 54 supported by a fixed pivot 56 on a bracket 58 clamped to an axle housing 60. One crank arm 62 is pivotally connected to a tie rod 66 extending laterally to a counterpart arm in assembly 52, and the other crank arm 68, on which a vehicle frame 69 is supported, is connected by a floating pivot 70 to one end of a connecting link 72 pivoted at its other end to a bracket 74. If desired, a resilient U-shaped bracket and an associated floating connecting link similar to bracket 38 and link 36 in Fig. 1 may be used in place of rigid bracket 74 and link 72. As may be noted, crank arm 68 is substantially longer than arm 62 and is reduced in cross section to provide sufficient resiliency to absorb any shock to which the linkage assembly may be subjected. Vehicle frame 69 and the stabilizing apparatus is supported on coil torrion springs 76 to provide a main suspension system for the vehicle, one loop of spring 76 in assembly 50 being secured to the crank arm 68 and the other spring loop being supported on axle housing 60.

Counterpart articulate assembly 52 on the other side of the frame may be identical to assembly 50 excepting that the bell crank is rotated in a vertical plane to a position where long crank arm 68 extends outwardly, and short arm 62 extends downwardly to permit tie rod 66 to cross a straight line passing through both fixed pivots 56. As in the modification of Fig. 1, each linkage assembly is capable of moving its respective floating pivot 70 in opposite directions and with a horizontal component for rotating the bell cranks and transmitting the force to the other side of the frame. If desired, the bell crank arms may be keyed to the pivot, instead of being a one-piece construction, for permitting an adjustment in the angular relationship of the arms.

The modification of Fig. 3 operates in a similar manner as previously described for the apparatus of Fig. 1, differing as noted in that the bell crank in each articulate assembly on each side of the frame incorporates a spring assembly for supporting the vehicle load. It is obvious that the modification of Fig. 3 is not limited to the use of a coil spring, as the apparatus of both Figs. 1 and 3 may be used with other types of spring suspension systems than those disclosed.

By the use of the foregoing equalizing apparatus, the stability of a moving vehicle during turning or when riding over irregularities in the road is greatly improved. In passenger cars such stability results in a smoother and more comfortable riding vehicle, whereas, in trucks the danger of shifting loads is materially reduced. As the frame is maintained substantially parallel to the axle, the stress on the spring suspension system on both sides of the vehicle is equalized and balanced. The equalizing apparatus is of a simple construction and can be installed on any vehicle requiring such apparatus without the need for a costly revision to the existing vehicle structure, or the equalizing apparatus may be incorporated with a suspension system. If desired, the equalizing apparatus may be mounted between the wheels on the rear axle, front axle, or between the front and rear axle.

Obviously, many modifications and variations of the present invention are possible in the light of the above teachings. It is, therefore, to be understood that within the scope of the appended claims the invention may be practiced otherwise than as specifically described.

I claim:

1. In a vehicle having a chassis and an axle, a stabilizing apparatus comprising a pair of spaced articulate assemblies disposed at opposite sides of the vehicle, each assembly including two pivotal linkage members connected by a floating pivot, one of said members being pivotally connected to the frame and the other member pivotally connected to the axle about a fixed pivot, one of said members in one assembly being a bell crank, a tie rod connected to one end of the bell crank in one assembly and to the floating pivot in the other assembly and crossing a straight line passing through the fixed pivot points, said floating pivots movable in a vertical plane in opposite directions, whereby a vertical thrust on one side of the frame will be transmitted to the other side in substantially the same direction.

2. In a vehicle having a chassis and an axle, a stabilizing apparatus comprising a pair of articulate assemblies, and a tie rod interconnecting the assemblies, at least one of the assemblies including a bell crank lever pivotally mounted on an axle about a fixed pivot, and a floating link pivotally connected at one end to the chassis frame and at the other end to a free end of said bell crank lever, the second of said pair of assemblies including a link having one end pivotally connected to the said axle about a fixed pivot, and a second floating link pivotally connected at one end to the chassis frame and at the other end to the other end of said fixed pivot link, said tie rod being interconnected between the other free end of said bell crank lever and of the first-mentioned assembly and the floating link of said second-mentioned assembly for translating vertical thrusts on one side of the vehicle to the other side in substantially the same direction, said tie rod crossing a straight line passing through both of said fixed pivots and said fixed pivots being disposed on said axle at opposite sides of the vehicle.

References Cited in the file of this patent

UNITED STATES PATENTS

| | | |
|---|---|---|
| 481,303 | Hamlin | Aug. 23, 1892 |
| 2,063,719 | Martin-Binachon | Dec. 8, 1936 |
| 2,094,174 | Kittel | Sept. 28, 1937 |
| 2,210,288 | Hansen | Aug. 6, 1940 |

FOREIGN PATENTS

| | | |
|---|---|---|
| 158,685 | Great Britain | Feb. 10, 1921 |
| 350,415 | Great Britain | Dec. 7, 1929 |